United States Patent [19]

Cohn et al.

[11] Patent Number: 4,555,787
[45] Date of Patent: Nov. 26, 1985

[54] GAS LASER PREIONIZATION DEVICE

[75] Inventors: David B. Cohn, Los Angeles; Eugene E. Conley, Huntington Beach, both of Calif.

[73] Assignee: Northrop Corporation, Hawthorne, Calif.

[21] Appl. No.: 476,946

[22] Filed: Mar. 21, 1983

Related U.S. Application Data

[62] Division of Ser. No. 186,663, Sep. 12, 1980, Pat. No. 4,380,079.

[51] Int. Cl.[4] ............................................. H01S 3/097
[52] U.S. Cl. ........................................ 372/86; 372/5; 372/87
[58] Field of Search ................................... 372/86–88, 372/55, 5

[56] References Cited

U.S. PATENT DOCUMENTS 4,380,079  4/1983  Cohn et al. ........................... 372/87

OTHER PUBLICATIONS

Cohn, "$CO_2$ Laser Excited by Preionized Transverse Discharge Through a Dielectric", Appl. Phys. Lett. 37 (9), Nov. 1, 1980, p. 771.

Primary Examiner—William L. Sikes
Assistant Examiner—Léon Scott, Jr.
Attorney, Agent, or Firm—Terry J. Anderson

[57] ABSTRACT

A gas laser having preionization means which comprises an elongated glass tube extending beside the glow discharge volume for the length of the laser cavity, there being a central conductor inside the tube and a conductive strip or spaced strips bonded to the outside of the tube. The inner wire and outer strip are connected respectively to the same high voltage pulse leads which provide the main laser discharge. Ultraviolet radiation from the conductive strips on the tube preionizes the laser gas and creates a stable uniform laser electric discharge.

2 Claims, 5 Drawing Figures

GAS LASER PREIONIZATION DEVICE

This application is a division of application Ser. No. 186,663, filed Sept. 12, 1980, now U.S. Pat. No. 4,380,079.

BACKGROUND OF THE INVENTION

1. Field of the Invention

The present invention relates to gas lasers, and more particularly, to improved means for providing ultraviolet preionization for pulsed gas lasers.

B 2. Description of the Prior Art

It is known that the discharge stability of pulsed gas lasers is greatly enhanced by supplying a preionizing radiation to the gaseous medium. Previous preionization sources have used: (1) spark boards which produce an array of arcs leading to ultraviolet radiation, (2) corona discharges embedded in the cathode, (3) corona discharges between metallic blades, (4) discharges to auxiliary wire electrodes, and (5) surface discharges. These methods have involved cumbersome geometries not amendable to small laser volumes having output cross-sectional areas of about 25 square millimeters or less, for example.

In the Review of Scientific Instruments, 50 (12), December 1979, page 1542, V. Hasson et al use a preionizer comprising a first wide flat copper foil inside a thin insulating board placed lengthwise opposite the lateral opening between the two main laser electrodes, and a second foil strip on the outside of the board. The foils are connected respectively to the same high voltage terminals as the two laser electrodes.

In the Review of Scientific Instruments, 51 (2), February 1980, page 216, N. Menyuk et al mention a UV-preionization system which consists of a row of series-connected spark gaps.

SUMMARY OF THE INVENTION

It is an object of this invention to provide a simple preionizing radiation device which is readily incorporated into a small laser volume. Other objects are to minimize gas contamination by having only a relatively small amount of metal exposed to the laser gas, and to provide a highly uniform preionizing radiation, thus eliminating the need in some prior-art schemes for a separate time delay circuit between the preionization voltage discharge and the main voltage discharge.

Briefly, our invention comprises an ultraviolet radiation generator positioned lengthwise of the laser gas cavity, adjacent to the discharge area and parallel to the beam axis. The generator comprises a dielectric hollow tube containing an inner wire therein and extended conductive means fixed along the outside surface of the tube on the side toward the laser optic axis, with the inner wire and outer conductive means being electrically connected to a high voltage pulse source which is synchronized with the main laser discharge pulse.

Preferably, the outer conductive means on the capillary tube comprises a sliding spark structure, with a series of relatively short, spaced strips.

DESCRIPTION OF THE PREFERRED EMBODIMENTS

Figure 1:
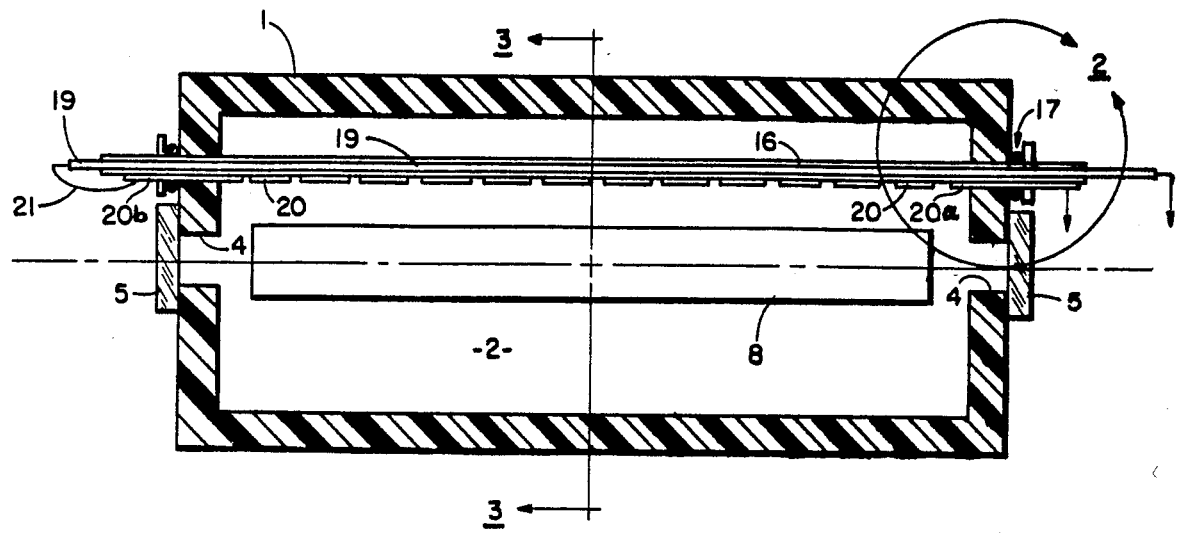
FIG. 1 is a longitudinal section view of a laser housing assembly incorporating our preionization device, the section being taken as indicated by broken line 1—1 in FIG. 3.
Figure 3:
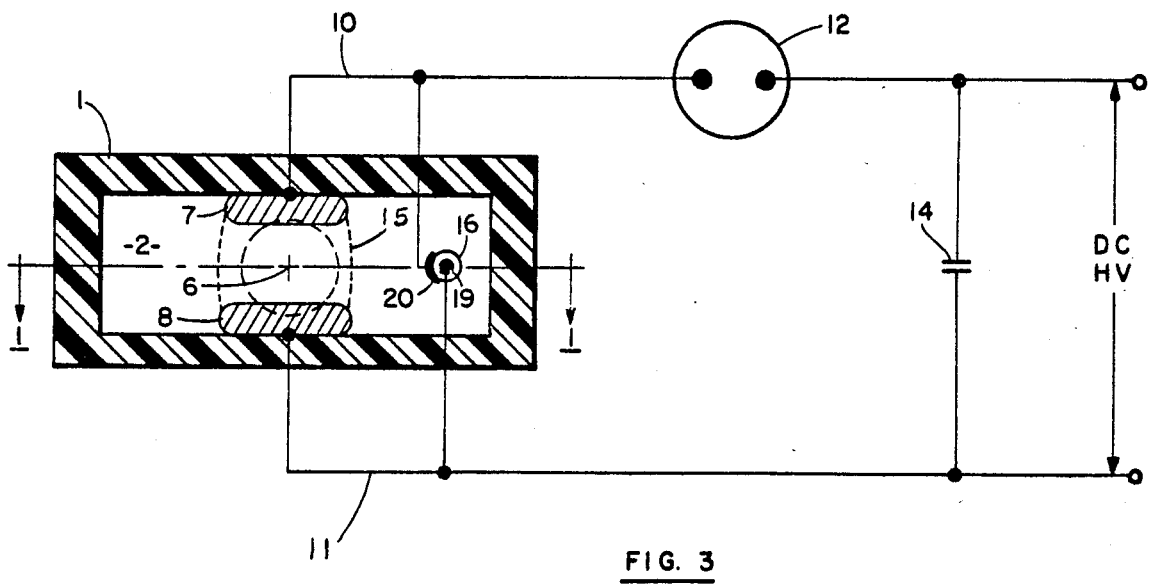
FIG. 3 is a cross sectional view and electrical schematic diagram, the section of the laser housing being taken as indicated by line 3—3 in FIG. 1 and rotated 90°.

Referring first to FIGS. 1 and 3 for a description of a specific apparatus incorporating this invention, an elongated ceramic laser housing 1 has a central gas cavity 2 and end apertures 4 for attachment of optical reflector mounts 5, thus defining a central optical axis 6. The present gas laser is assumed to be a closed cavity laser for sealed operation, although suitable passages (not shown) through the walls of the housing 1 may be provided to operate as a circulating gas laser.

A conventional metallic anode 7 and cathode 8 are bonded or otherwise secured in the top and bottom, respectively, of the housing 1, these electrodes extending substantially the full length of the housing. Electrical leads 10 and 11 (FIG. 3) are connected through the housing to the anode and cathode for further connection to a high voltage pulse system. Anode lead 10 connects to one side of a spark gap 12, the other side of which is connected to the high voltage side of a discharge capacitor 14. Cathode lead 11 connects to the grounded side of the capacitor 14. A high DC voltage source (not shown) of suitable nature is to be connected across the capacitor 14. This assembly forms a typical transversely excited glow discharge gas laser, which may use $CO_2$ for example. When a high voltage DC is applied to the input, the spark gap 12 automatically sparks over each time the capacitor 14 reaches the required charge voltage. The resulting pulses of high voltage across the electrodes 7 and 8 ionize the contained gas and form a glow discharge therein, the main glow discharge volume 15 being substantially bounded by the outer edges of the electrodes 7 and 8 as indicated in FIG. 3.

Figure 2:
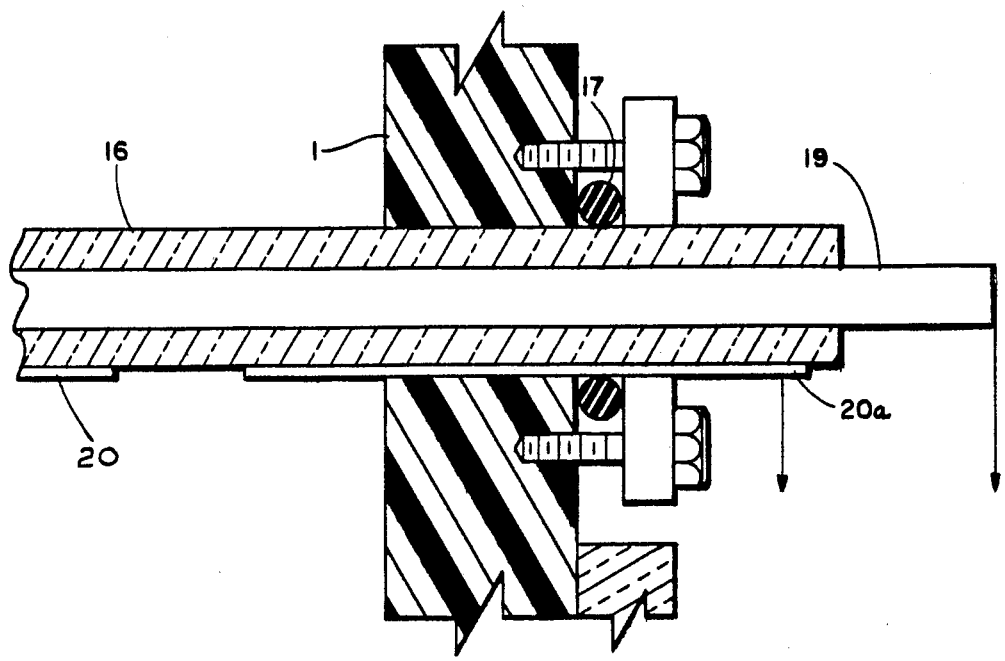
FIG. 2 is an enlarged fragmentary detail, viewed where indicated by broken circle 2 in FIG. 1.

Now the preionizer of the present invention includes a capillary tube 16 of quartz glass, for example, located parallel to the optical axis 6 inside the housing 1, outside the main discharge volume 15, and substantially equidistant from the anode 7 and cathode 8. The ends of the tube 16 extend through the ends of housing 1, and are pressure sealed there by O-ring seals 17, for example, the latter being shown in FIG. 2.

A large, closely fitting wire 19 is installed in the bore of the tube 16, with the wire ends extending slightly beyond the tube ends. On the outer surface of tube 16 is provided a series of spaced metal foil segments 20 bonded to the entire length of tube 16, preferably along the side of the tube facing toward the main discharge volume 15. At the right end of the tube 16 in FIG. 1, the first foil segment 20a and the inner wire 19 are connected directly to the anode and cathode leads 10 and 11, respectively. At the left end of tube 16, the last foil segment 20b is connected electrically to the inner wire 19 by a short jumper 21 for example. This comprises a sliding spark discharge, operable when the high voltage pulse is applied. With application of the high voltage pulse to the first segment 20a, arcs develop progressively between all succeeding strips resulting in an essentially linear arc source, as opposed to a plane or sheet type device of the prior art. The arcs emit ultraviolet light which then preionizes the laser gas.

Although other types of sliding spark discharges have been proposed for preionizer use with gas lasers, the present invention gives a much preferred arrangement which is simpler and is adaptable to most lasers. The inner wire 19 can be of any diameter, but a large wire is preferred so that a larger capacitance is formed between each segment 20 and the opposite side of the electrical line, to thus assure an arc striking at each segment space.

Figure 4:
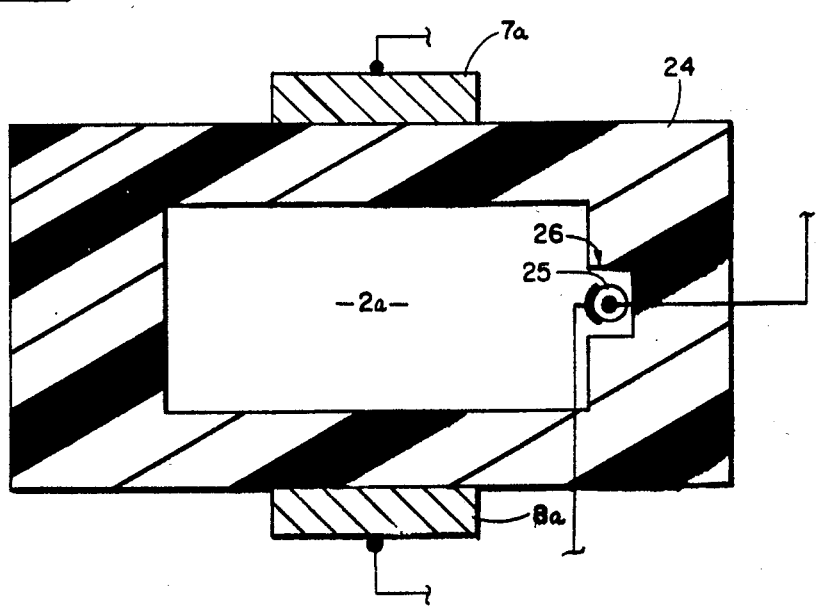
FIG. 4 is a cross sectional view of the preionization device of this invention incorporated in a different laser body structure.

FIG. 4 shows an example of this preionizer applied to a general form of so-called capacitively coupled discharge laser, wherein the main electrodes are located outside the gas cavity. In this construction, a ceramic laser casing 24 is provided with a gas cavity 2a as usual, but the anode 7a and cathode 8a are fastened to the outside of the top and bottom walls of the casing 24. A capillary tube preionizer 25 as described previously is positioned in a sidewall channel 26 to provide proper separation from the main glow discharge. The ends of the preionizer 25 are brought out of the casing 24 and sealed as in FIG. 2, for example.

The present tubular type of preionizer may obviously be modified to various degrees while still operating in the same manner and achieving the same kind of results. The structure shown in FIG. 5, for example, can be used. Here, a similar capillary tube 16b has a similar inner wire 19b, and a single continous metal foil strip 27 is fixed to the outside of the tube 16b. The wire 19b and strip 27 are of course connected across the high-voltage pulser to generate the desired preionizing pulse.

Figure 5:
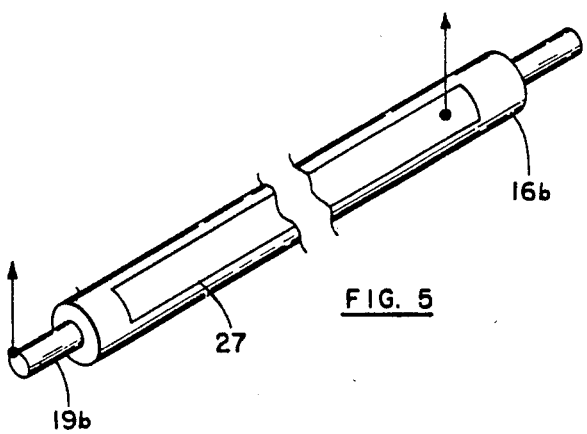
FIG. 5 is a perspective view showing a different embodiment of the present preionization device.

In the design of FIG. 5, ultraviolet radiation is emitted from a corona discharge formed on the surface of capillary tube 16b. The foil strip 27 should be placed at the top or bottom of the tube 16b as installed, for best UV emission toward the main discharge area. This preionizer construction can obviously be employed with either of the laser bodies of FIG. 3 or FIG. 4. However, the sliding spark type preionizer of FIG. 1 is preferred since the UV radiation from the spark discharge is stronger than from the corona developed in FIG. 5.

The present preionizer is well suited to relatively small laser volumes, in contrast to conventional preionizing schemes. In one example of an actual laser, the capillary tube 16 had an outside diameter of about 3.1 mm, an inside diameter of about 1.9 mm, and a length of about 50 cm. The metal segments 20 were aluminum foil 0.010 inch thick (0.25 mm), 0.25 inch long (6.4 mm) and 0.125 inch wide (3.2 mm), spaced 0.125 inch (3.2 mm) apart. These segments extend about one fourth to one third of the way around the tube 16 or 16b. The tube 16 should be spaced from the optical axis 6 about two to four times the height of the main discharge volume. The high voltage pulses for the embodiment of FIG. 3 are about 18 KV and for FIG. 4 are about 30 KV, for example. The electrodes 7 and 8 may be aluminum. The foil strips may be epoxied to the glass tube, for example.

Of course, the adhesive-coated foil can be replaced by other, equivalent, elements, such as deposited metallic film layers if desired.

It is thus seen that a very simple and compact preionizer has been provided, which is especially useful in lasers of small volumes which are finding more and more applications in both civilian and military areas. Due to the fact that the preionizer actually comes up to operating voltage first, before the main electrodes 7 and 8 in the larger circuit, the ultraviolet radiation begins a few nanoseconds before the main glow discharge, which is exactly as desired. Therefore, no separate pulse circuits or time delay circuits are needed. However, this preionizer is not required to be directly wired to the main electrode leads; it can be wired in a separate control circuit. The preionizer tube 16 should extend the full length of the gain medium.

While in order to comply with the statute, the invention has been described in language more or less specific as to structural features, it is to be understood that the invention is not limited to the specific features shown, but that the means and construction herein disclosed comprise the preferred mode of putting the invention into effect, and the invention is therefore claimed in any of its forms or modifications within the legitimate and valid scope of the appended claims.

What is claimed is:

1. Apparatus for producing ultraviolet radiation for preionizing gas in a laser having a high voltage source, electrodes for generating a discharge when energized by said high voltage source, and a resonant cavity containing a gain medium excitable by said discharge from said high voltage source, the preionizing apparatus comprising:
   a hollow dielectric tube positioned within said resonant cavity;
   an inner wire conductor within said dielectric tube;
   at least one outer conductor positioned along the outer surface of said dielectric tube; and
   electrical connector means for applying a signal from said high voltage source across said dielectric tube between said inner wire conductor and said outer conductor to generate ultraviolet radiation in the cavity to preionize the gain medium in the cavity
   whereby said ultraviolet radiation is caused to create a stable uniform discharge of the gain medium.

2. Apparatus for producing ultraviolet radiation for preionizing gas in a laser having a high voltage source, opposing electrodes for generating a laser discharge when energized by said high voltage source, and a resonant cavity containing a gain medium excitable by said discharge from said high voltage source, the preionizing apparatus comprising:
   a hollow dielectric tube positioned within said resonant cavity;
   an inner conductor means within said dielectric tube;
   a plurality of outer conductor means along the outer surface of said dielectric tube; and
   electrical connector means connected to said high voltage source for applying a signal to generate ultraviolet radiation in the cavity by spark discharge before the discharge of the electrodes of the laser
   whereby said laser is caused to create a stable uniform discharge of the gain medium because of preionization of the gain medium by the apparatus.

* * * * *